Aug. 7, 1928.
W. H. FULWEILER
1,679,858
PROCESS FOR PURIFYING GASES
Filed Dec. 4, 1923
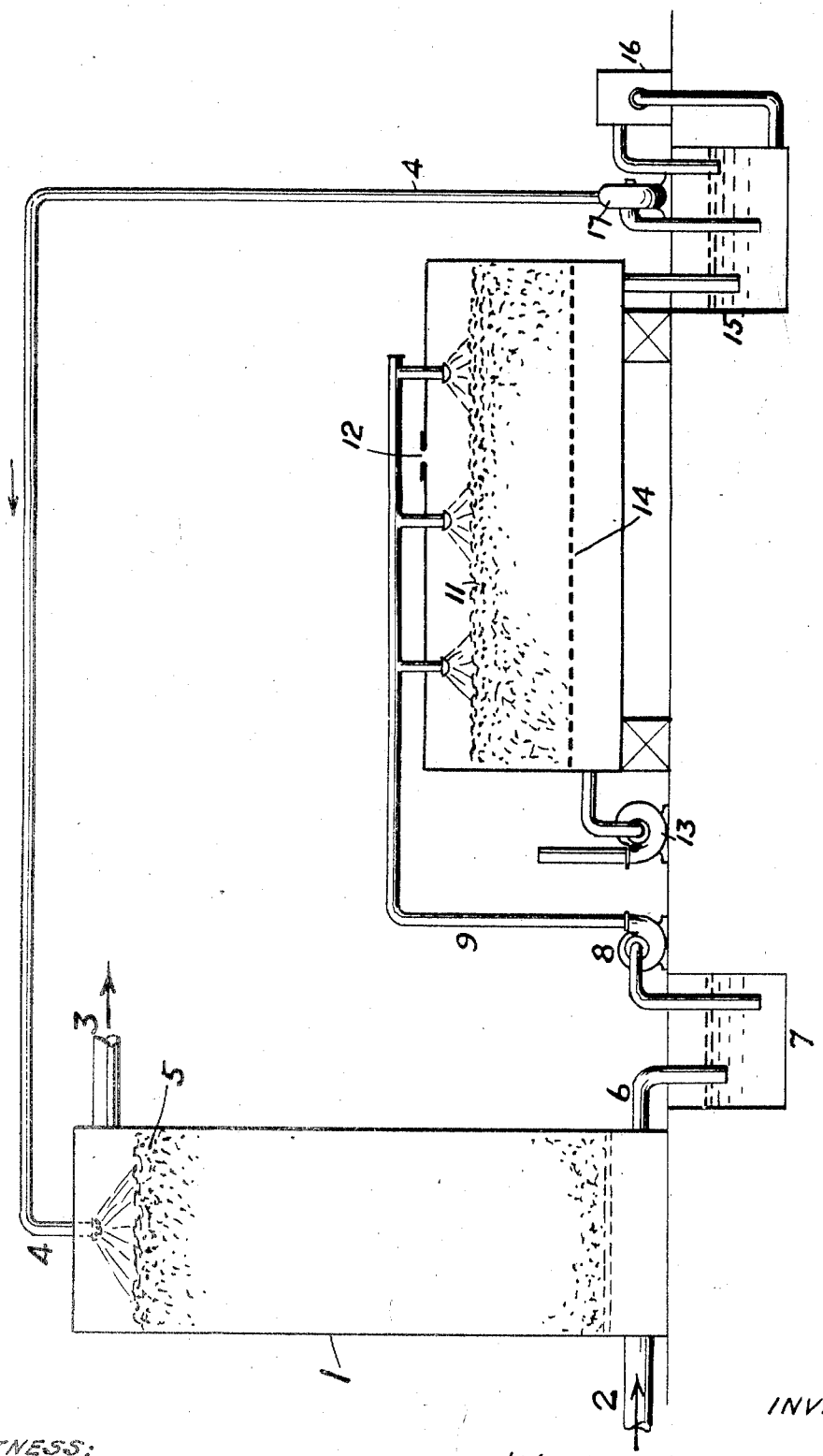
INVENTOR
Walter H. Fulweiler.
BY
Augustus B. S. Foughton
ATTORNEY.
WITNESS:
Rob R Kitchel.

Patented Aug. 7, 1928.

1,679,858

UNITED STATES PATENT OFFICE.

WALTER H. FULWEILER, OF WALLINGFORD, PENNSYLVANIA, ASSIGNOR TO THE U. G. I. CONTRACTING COMPANY, OF PHILADELPHIA, PENNSYLVANIA, A CORPORATION OF DELAWARE.

PROCESS FOR PURIFYING GASES.

Application filed December 4, 1923. Serial No. 678,431.

The principal object of the present invention is to economically and satisfactorily remove hydrogen sulphide from illuminating and other gases by scrubbing and in such a way that the scrubbing solution when foul is revivified or fitted for re-use without pollution of the surrounding atmosphere by hydrogen sulphide or other noxious gases. Another object of the invention is to provide for recovering free sulphur from the foul solution in the process of re-vivifying it or fitting it for re-use.

To these and other ends hereinafter set forth the invention in one of its aspects comprises the selective oxidization of the foul solution, with deposition or liberation of sulphur as such, principally or essentially to a body or bodies capable of combining with or taking on hydrogen sulphide in the re-use of the solution as distinguished from a body or bodies lacking that capability. In another of its aspects the invention comprises the provision of a scrubbing solution containing weak free acid and which, when subjected to selective oxidization, gives rise to the production of more of the body or bodies capable of removing hydrogen sulphide from the gas in the scrubbing operation than to a body or bodies lacking that capability. The invention further comprises the process of revivifying or fitting foul solutions for re-use which consists in spraying the same onto or passing them in film form over catalytic material as coke in the presence of air with deposition of sulphur as such.

In practice this process is used for the removal of hydrogen sulphide from illuminating gas and it is carried out by scrubbing the gas with an aqeous solution of a salt that is sufficiently alkaline to absorb hydrogen sulphide from the gas, thus forming a hydrosulphide or foul solution. In the second stage of the process the sulf-hydrate, hydrosulphide or foul solution is passed in a layer sufficiently thin or film over some form of catalytic material (coke has been successfully used and it is cheap and available) and this is done in the presence of air so that the oxygen of the air will react with the hydro-sulphide to the end that the hydrosulphide is decomposed, re-forming the original salt and setting free sulphur. This second stage of the process may be referred to as a preferential oxidization because if the oxidization is too violent sodium thiosulphate will be formed, while if it is still more violent sodium sulphate will be formed and both these salts are inactive for removing hydrogen sulphide so that the object is to cause the maximum amount of sulphur to go to free sulphur and the minimum amount to go to sulphate or other inactive salts in order that the process may be carried on with the minimum expenditure of salts.

If there is present in the solution an appropriate amount of free acid, such as boracic acid, the percentage of the salt going to thio-sulphate and sulphate will be reduced, and the percentage going to salts active in the removal of hydrogen sulphide from the gas increases. However, if the percentage of free weak acid is permitted to unduly increase, it will reduce the ability of the solution to absorb hydrogen sulphide. For example, if a solution of sodium tetra-borate (borax) is used, there will be built up the necessary amount of free acid as boracic acid and in continuing the operation or practice of the process the amount of free acid can be controlled by the addition to this solution, from time to time, of cheaper forms of sodium salts such as sodium carbonate or soda ash.

In further describing the invention reference may be made to the accompanying drawing, the single figure of which illustrates diagrammatically and schematically and principally in central sectional elevation one form of apparatus in connection with which the process of the invention may be practiced.

A stream of gas flowing upwardly as from 2 to 3 in a tower 1 filled with some material 5 that will expose a large surface, such as coke, tiles and the like, is scrubbed with a downwardly flowing stream of absorbing liquid composed of a solution of borax and in which after repeated use the free boracic acid is neutralized or partially neutralized by the addition of sodium carbonate or soda ash so that the titratable sodium ion present may be between 5 to 10 grams per liter, while the free boracic acid will be of the order of 10 grams per liter. Such solutions will absorb from 40 to 60 grains of hydrogen sulphide per gallon, and the amount of solution used per hundred feet of gas is regulated with a view to removing the required amount of hydrogen sulphide, having regard to the initial amount present. Otherwise expressed, for a coke oven gas containing 650 grains of hydrogen sulphite per liter, it will be necessary to circulate about 100 gallons of solution per 1,000 feet of gas in order to remove 600 grains of hydrogen sulphide per 100 feet of gas. The process may be well practiced at a temperature above 70° F. The solution introduced at 4 leaves the tower or scrubber purifier 1 at 6 entering the sump 7.

In scrubbing commercial coke oven gas which contains carbon dioxide and cyanogen in addition to hydrogen sulphide, carbon dioxide is absorbed for a short time at the beginning of the operation and until it comes into equilibrium with the solution after which only a relatively small amount will be absorbed corresponding to the addition of fresh soda ash to the solution. In the case of cyanogen it is absorbed, in case sodium salts are used, forming sodium cyanide, and a portion of this sodium cyanide combines with hydrogen sulphide forming sodium sulphocyanide so that a certain amount of soda is consumed in making up this loss.

The solution which has absorbed hydrogen sulphide or, in other words, the foul solution from the sump 7 by the pump 8 and by pipe 9 is sprayed over a bed 11 of some catalytic material which will cause maximum decomposition of the sodium hydrosulphide to free sulphur and minimum formation of sodium thiosulphate, sulphate or other salts which are inert or ineffective for further use in absorbing hydrogen sulphide. A bed consisting of a layer of coke from 3 to 5 feet in depth is efficient in causing this reaction to take place. From experience it appears that the rate of supply of the foul solution to the bed of coke should be limited or controlled. If the foul solution is sprayed over the surface of the coke in too thick a film, the described reaction does not take place, but if the film is sufficiently thin the reaction takes place very efficiently. In this way the rate can be ascertained readily and without undue experimentation. However, it may be said that a rate of $7\frac{1}{2}$ gallons per hour per square foot of surface of the described bed should not be exceeded for efficient reaction. A certain amount of air must be available to the bed 11 in order to furnish the necessary oxygen to carry the reaction forward to completion. As shown this is done by drawing down through the opening 12 in the chamber 11 and through the coke a small quantity of air as by the blower 13. This air supplies the necessary oxygen and when it issues from the bottom 14 of the layer 11, or from the outlet of the blower 13, it will be free from hydrogen sulphide. An indication that too much air is being used is the presence of traces of hydrogen sulphide in the outgoing air. Coke screened to a rather uniform size not exceeding two inches in the largest dimension and washed fairly free from breeze gives efficient results. Better results are obtained if a superficial layer of ferric oxide is deposited on the surface of the coke by soaking it in some decomposable iron salts, preferably of an organic acid, and heating to redness. It is not well to use too efficient a catalyst, for example, if vanadium be used the formation of sodium thio-sulphate or sodium sulphate is likely to be excessive.

At the start of the process the free sulphur formed in the reaction between the oxygen of the air and the ingredients of the foul solution in the presence of coke is absorbed by the latter but after a certain amount of sulphur has been thus absorbed the free sulphur washes through and may be removed from the solution and recovered by a filter press or equivalent apparatus. In the drawings the revivified solution and the free sulphur pass from 14 into the sump 15, and the free sulphur is extracted as such by the filter press 16 and its connections, and the revivified solution is passed by the pump 17 to the pipe 4 for re-use. Temperatures above 70° F. are advantageous in decomposing the sodium hydro-sulphide to free sulphur.

Solutions of sodium carbonate alone may be used in this process or in fact solutions of any alkaline salt that will absorb hydrogen sulphide. However, it appears that the presence of a free weak acid such as boracic acid, which can be secured by starting with a solution of borax, opposes the formation of undesirable salts such as sodium thio-sulphate and sodium sulphate and increases the percentage of free sulphur which may be recovered and consequently promotes the fitting of the solution or revivifying of the solution for re-use in scrubbing hydrogen sulphide and other impurities from additional supplies of gas.

For the sake of further explanation it may be indicated that the bed 11 probably operates through a surface action in which oxygen is adsorbed from air and given up to the hydro-sulphide or sulf-hydrate in the foul solution, and this is referred to as indicating that the invention being in its nature chemical is obviously not to be limited to the precise procedure nor to the exact ingredients set forth or otherwise than as the prior art and the appended claims and the doctrine of equivalents appropriate in the case of chemical inventions may require.

I claim:

1. In the process for purifying gas by the action of a solution of a salt sufficiently alkaline to absorb hydrogen sulphide gas as sulf-hydrate thereby becoming foul, the improvement which consists in preferentially oxidizing the sulf-hydrate principally to the original salt with liberation of sulphur as such by passing the foul solution in film form over coke in the presence of air.

2. In the process for purifying gas by the action of a solution capable of absorbing hydrogen sulphide gas thereby becoming foul, the improvement which consists in extracting sulphur as such from the foul solution by the action of coke in the presence of air thereby revivifying or fitting the solution for re-use.

3. In the process of purifying gas by the action of a solution of a salt sufficiently alkaline to absorb hydrogen sulphide gas as sulphydrate thereby becoming foul, the improvement which consists in oxidizing the sulphydrate principally to the original salt with liberation of sulphur as such by subjecting it to the action of air in limited quantity adapted to produce free sulphur as distinguished from driving off free hydrogen sulphide.

WALTER H. FULWEILER.